3,201,170
MOTOR VEHICLE SUN VISOR WITH
ADJUSTABLE WINGS
Abraham Weingarten, 74—58 260th St., Glen Oaks, N.Y.
Filed Mar. 12, 1963, Ser. No. 264,615
4 Claims. (Cl. 296—97)

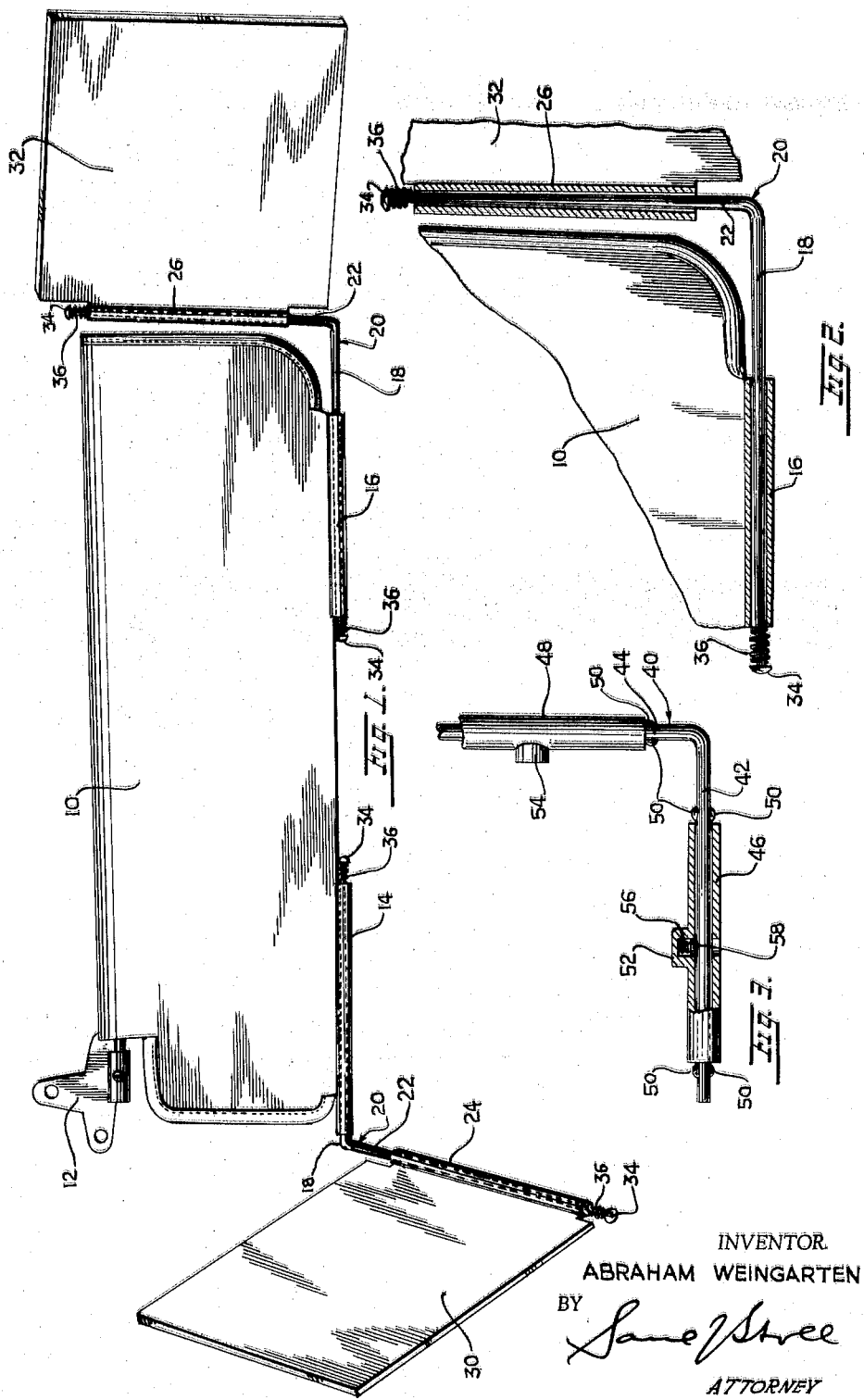

This invention relates to a sun visor for motor vehicles, said sun visor being provided with at least one, and preferably two, adjustable wings.

Sun visors with adjustable wings are known to the prior art. The adjustable wings assume various forms and they are adjustably connected to the sun visor by various means. However, their utility is restricted by the limitations which are necessarily imposed upon their adjustability by their connecting means. Specifically, although some of these adjustable wings are mounted on universal type swivel connections, their range of movement is limited by a single pivotal point. In other words, the adjustable wings of the prior art are limited in their adjustment to angular movement about a single pivotal point.

The present invention has as its primary object the provision of a sun visor having at least one adjustable wing, said wing being mounted for angular movement about a pivotal axis generally paralleling the longitudinal axis of the sun visor, as well as for pivotal movement about a second axis transverse to the first. When the sun visor is situated with its longitudinal axis extending in a horizontal plane transverse the longitudinal axis of the motor vehicle, the first axis of rotation of the wing is similarly situated in a horizontal plane transverse the longitudinal axis of the motor vehicle. By the same token, the second axis of rotation would be situated in a vertical plane paralleling the longitudinal axis of the motor vehicle. The effect of the use of two such pivotal axes, each disposed at right angles to the other, is to provide a very flexible and versatile arrangement whereby the wing may be adjusted to many useful positions with respect to the sun visor and the driver of the motor vehicle.

An important object of this invention is the provision of an L-shaped rod as the connecting means between the sun visor and the wing. One arm of the L-shaped rod provides the first axis of rotation, and the other arm provides the second axis of rotation. One arm is rotatably secured to the sun visor; the other arm is rotatably secured to the wing.

Another important object of the invention is the provision of spring-urged frictional means for positioning the L-shaped rod in any selected position relative to the sun visor, and for positioning the wing in any selected position relative to the L-shaped rod. Specifically, each arm of the L-shaped rod comprises a tapered pin, and each said tapered pin is mounted within a tapered sleeve or mechanical equivalent thereof. One such tapered sleeve is mounted on the sun visor, and the other on the wing. A spring urges each said tapered pin in the direction of its smaller end and the smaller end of the tapered sleeve, thereby tensionally seating the tapered pin firmly within its tapered sleeve. This arrangement provides frictional means for firmly supporting one of said pins in any selected angular position relative to its tapered sleeve and, similarly, it provides a firm supporting means for holding the other tapered sleeve in any selected angular position with respect to the tapered pin on which it is mounted.

Depending upon various factors, this tapered pin-and-sleeve arrangement provides excellent positioning means for the wing relative to the visor. The wing may be moved manually to any desired position relative to the sun visor, and it will automatically be retained in that position until manually moved to another position, by the means thus described. The factors which would control the frictional grip between the tapered pins and the tapered sleeves include the following: the degree or angle of taper of the pins and their respective sleeves, the area of contact between said pins and said sleeves, the degree of spring tension applied between them, and other factors which would be readily known to engineers skilled in the art.

In a modification of the foregoing, neither the L-shaped rod nor its two sleeves are tapered. Spring tension is applied between the two arms of the rod and their respective sleeves by means of a spring exerting tension transverse the longitudinal axis of said arms and sleeves. In all other respects, this modification resembles the principal form of the invention, both structurally and functionally.

It will be apparent from the foregoing that other positioning means may be provided between the L-shaped rod and its two sleeves, the invention not being limited to the specific means illustrated in the drawing. The principal feature of this invention resides in the use of an L-shaped member which is rotationally attached at one arm to the sun visor of a motor vehicle, and which has an adjustable wing rotationally attached to the other arm. It is not a critical matter whether one positioning means or another is applied to said L-shaped member.

On the other hand, an important feature of this invention may have other applications. Reference is now made to the use of a tapered rod within a tapered sleeve and means for axially urging said rod in the direction of its smaller end, and the corresponding smaller end of the sleeve. This is a highly useful and advantageous angular positioning means which may have many and diverse applications, especially in connection with an L-shaped rod of the character under discussion, either or both of its arms being tapered.

Another important feature of this device is that it may be applied to existing equipment as an accessory. For example, it may be clipped, bolted or otherwise attached by conventional fastening means to a conventional visor. This would render it possible for owners of existing vehicles to obtain the benefits of this invention by attaching the present device to the sun visors which are presently installed in their respective vehicles. On the other hand, this device may be installed as original equipment, and this is substantially the manner in which it is illustrated in the drawing.

The invention is illustrated in the accompanying drawing in which:

FIGURE 1 is a view of a sun visor of the character described having a pair of side wings adjustably mounted thereon, said wings being shown in different positions relative to said visor.

FIGURE 2 is an enlarged fragmentary view in section showing the use of an L-shaped member having a pair of tapered arms mounted within a pair of tapered sleeves and adjustably securing one of said side wings to said visor.

FIGURE 3 is a view similar to that of FIGURE 2 but showing a modification of the L-shaped member, said member having non-tapered arms and being mounted in non-tapered sleeves.

Referring in the first instance to FIGURES 1 and 2 in which the principal embodiment of this invention is shown, it will be noted that a sun visor 10 is provided with a conventional swivel attachment 12 by which it may be adjustably secured to a suitable structural member in a motor vehicle. Except as hereinafter distinguished, the sun visor may be a completely conventional device, attached for conventional installation and use.

Secured to or formed on the lower longitudinal edge of the sun visor is a pair of sleeves 14 and 16, respectively. These sleeves may be made of material or plastics or any other suitable material and they may be integral with the sun visor or fastened thereto. The external configuration of these sleeves is of no significance, but internally they should be tapered in the manner illustrated in FIGURE 2. The smaller end of tapered sleeve 14 faces the smaller end of tapered sleeve 16, and it will therefore be noted that the smaller end of sleeve 14 is its right-hand end, while the smaller end of sleeve 16 is its left-hand end. In the preferred form of this embodiment, these two sleeves define relatively elongated truncated cones of relatively small cross-sectional dimensions, reference being here made to the internal configuration of said sleeves.

Inserted within each of these tapered sleeves is one arm 18 of an L-shaped member 20. Arm 18 is tapered and dimensioned to correspond with and fit into tapered sleeves 14 and 16. As clearly appears in FIGURE 2, tapered arm 18 and tapered sleeve 16 define, in effect, a pair of nested truncated cores, arm 18 being of course considerably longer than sleeve 16 (or sleeve 14) in order to project outwardly therefrom at both ends.

It will now be noted that the other arm 22 of said L-shaped member 20 corresponds to tapered arm 18 and also defines an elongated truncated cone of relatively small transverse dimensions. The angle between the two tapered arms 18 and 22 is preferably a right angle, but not necessarily so. Another useful angle for the purposes of the present invention would be one which is slightly larger than 90 degrees, but this is purely a matter of preference and design, depending upon many factors including the individual requirements of the particular motor vehicle into which the device may be installed.

Mounted on tapered arms 22 of the two L-shaped members 20 are tapered sleeves 24 and 26, respectively, these sleeves corresponding substantially to sleeves 14 and 16 above described. The arms of the L-shaped members 20 need not be of identical length, that is, arm 18 may be longer or shorter, as desired, than arm 22. By the same token, sleeves 24 and 26 need not necessarily be of the same length as sleeves 14 and 16. What is needed is that each sleeve and each arm be of suitable length relative to each other. The factors determining such length are well known to engineers skilled in the art and include such matters as adequate bearing surface area and distribution, sufficient contact area for frictional engagement, etc.

Mounted on tapered sleeve 24 is right-side wing 32 thereof. As is the case with sun visor 10 and sleeves 14 and 16, sleeves 24 and 26 may be integral with or secured to their respective side wings. This is a matter of choice and design. In either case, these side wings are rotatably mounted by means of their respective sleeves 24 and 26 on arms 22 of the L-shaped members 20. By the same token, these L-shaped members are rotatably mounted by means of tapered sleeves 14 and 16 on sun visor 10.

Each of the two tapered arms 18 and 22 is provided at its free end with a head 34 which may be a nut or other suitable enlargement or retaining device. Mounted on each of said arms, between said head and the adjacent end of the corresponding sleeve, is a coiled compression spring 36. This spring exerts an axial force between the arm on which it is mounted and the sleeve which it abuts. It will be noted in FIGURE 2 that the thrust of this force is such as to urge the tapered arm in the direction of its smaller end while urging the tapered sleeve in the direction of its larger end. The result is to firmly seat the tapered arm within the tapered sleeve and to provide substantial frictional engagement between said arm and said sleeve. Depending upon the strength of the spring and other factors, the frictional coefficient between said arm and said sleeve will be such as to permit of relative movement between them under manual urging, while resisting such relative movement at all other times during normal use of the sun visor.

It will be understood from the foregoing description of this invention that side wings 30 and 32 may pivot a full 360 degrees about the longitudinal axes of sleeves 14 and 16, and also a full 360 degrees about the longitudinal axes of sleeves 24 and 26. Rotational movement about the axes of sleeves 14 and 16 is always possible. On the other hand, this is not always true of rotational movement about the axes of sleeves 24 and 26. This is illustrated in FIGURE 1 of the drawing, wherein the position of L-shaped member 20 at the right end of the sun visor is such as to prevent a full 360 degrees of rotation of wing 32 about the axis of sleeve 26 because of interference with the sun visor. The position of L-shaped member 20 at the left end of the sun visor is such as to permit a full 360 degrees rotational movement of wing 30, since there would be no conflict or interference by or with the sun visor.

The modification of the invention illustrated in FIGURE 3 differs from that shown in FIGURES 1 and 2 in that the L-shaped member 40 is not provided with tapered arms. Instead, its two arms 42 and 44, respectively, are non-tapered and define elongated cylinders of relatively small diameter. Since arms 42 and 44 are not tapered, their respective sleeves 46 and 48 are similarly not tapered.

Sleeve 46 is secured to or made a part of sun visor 10 in precisely the same or like manner as sleeves 14 and 16 above described. Similarly, sleeve 48 is secured to or made a part of a wing such as wings 30 and 32, this being done in much the same or identical manner as sleeves 24 and 26 are either attached to or made a part of wings 30 and 32.

The complementary tapers of the tapered arms and sleeves above described, coupled with the axial force exerted by coil springs 36, effect a nesting relationship between said arms and said sleeves to prevent relative axial movement between them. In FIGURE 3, such tapered relationship does not exist, and consequently other means must be provided to prevent axial dislodgment of arms 42 and 44 relative to sleeves 46 and 48. One such means would simply be the use of lugs or ears 50 pressed out of arms 42 and 44. This would be an inexpensive and efficient method, but it is obvious that other methods and means may also be utilized.

Sleeves 46 and 48 are provided with bosses 52 and 54, respectively. These bosses are hollow and accommodate a coil spring 56 and a bearing element 58. The spring presses the bearing against arm 42 or 44, as the case may be, and provides the necessary frictional engagement therewith to position the arms and sleeves relative to each other. It will of course be understood that the rings may be pivoted about the longitudinal axis of arm 44, and the L-shaped member 40 may be pivoted about the longtiudinal axis of arm 42. Once set in any desired or selected angular positions, the side wings will be retained in such positions by the spring-urged frictional means 58 above described. The foregoing is illustrative of two preferred forms of this invention, and it will be clearly understood that these forms may be modified and many other forms may be provided within the broad scope of the invention and the appended claims.

By way of illustration, set screws may be used to position the wings with respect to the L-shaped members, and they may also be used to position the L-shaped members with respect to the sun visor. This modification would apply to FIGURE 3, and in such case lugs 50 would be eliminated. Once they are eliminated it would be possible to longitudinally adjust the position of the wings on the L-shaped members and the L-shaped members with respect to the sun visor.

It will be appreciated that this longitudinal adjustment will render it a simple matter to raise or lower the side wings relative to the driver. It will be appreciated that shorter and taller drivers will require different settings of this equipment. Moreover, even in the form presently shown in the drawing such vertical adjustment may be had by simply tilting the sun visor about the horizontal arm on bracket 12 on which the sun visor is mounted.

What is claimed is:

1. Means for adjustably mounting side wings on each side of the sun visor of a motor vehicle, comprising tapered sleeves connected to each side of said sun visor at the bottom edge thereof, two L-shaped members, one arm of each of said L-shaped members being tapered complementarily to said sleeves and rotatably mounted within said sleeves, second tapered sleeves being rotatably mounted on the other arms of said L-shaped members, said other arms being tapered complementarily to said second sleeves, and said second sleeves being connected to said side wings; a tension element provided between each of said arms and its respective sleeve to cause sufficient frictional engagement therebetween to prevent accidental angular dislodgement of said arms relative to their respective sleeves, each arm being nested within its respective sleeve in coaxial relationship, their respective tapers being oriented in the same direction, each of said arms being provided at its small end with a stop element, said tension element being provided between said stop element and the corresponding end of the sleeve to exert an axial thrust upon the arm and the sleeve, urging the arm in the direction of its smaller end and urging the sleeve in the direction of its larger end.

2. Means for adjustably mounting side wings on each side of the sun visor of a motor vehicle, comprising sleeves connected to each side of said sun visor at the bottom edge thereof, two L-shaped members, one arm of each of said L-shaped members being rotatably mounted within said sleeves, second sleeves being rotatably mounted on the other arms of said L-shaped members, said second sleeves being connected to said side wings, each of said sleeves being provided with a radially extending hollow housing, a compression spring being provided within each said housing, and a bearing element being provided between said spring and the arm within the sleeve, said spring acting to press said bearing element against said arm to provide sufficient frictional engagement between them to prevent accidental angular dislodgement of said sleeve relative to said arm, and said arm relative to said sleeve.

3. Mounting means for adjustably mounting a side wing on each side of the sun visor of a motor vehicle, said mounting means comprising two L-shaped members, each of said L-shaped members having one arm which is adapted to be mounted on said sun visor for 360 degree angular movement relative thereto about the longitudinal axis of said arm, the other arm of each of said L-shaped members being adapted to be mounted on a side wing in order to support said side wing and to permit 360 degree angular movement of said side wing relative to said second arm about the longitudinal axis of said second arm; tension means provided on each of said arms to frictionally hold said first arms in any selected angular position relative to the sun visor, and to frictionally hold the side wings in any selected angular position relative to said second arms, each of said arms being provided with a sleeve, the sleeves on said first arms being the connecting means whereby said first arms are adapted to be mounted on said sun visor, the sleeves on said second arms being the connecting means whereby the wings may be mounted on said second arms.

4. Mounting means for adjustably mounting a side wing on each side of the sun visor of a motor vehicle, said mounting means comprising two L-shaped members, each of said L-shaped members having one arm which is adapted to be mounted on said sun visor for 360 degree angular movement relative thereto about the longitudinal axis of said arm, the other arm of each of said L-shaped members being adapted to be mounted on a side wing in order to support said side wing and to permit 360 degree angular movement of said side wing relative to said second arm about the longitudinal axis of said second arm; tension means provided on each of said arms to frictionally hold said first arms in any selected angular position relative to the sun visor, and to frictionally hold the side wings in any selected angular position relative to said second arms; each of said arms being provided with a sleeve, the sleeves on said first arms being the connecting means whereby said first arms are adapted to be mounted on said sun visor, the sleeves on said second arms being the connecting means whereby the wings may be mounted on said second arms, each of said arms being tapered and defining a truncated cone having a relatively long longitudinal dimension, and relatively small transverse dimensions, each of said sleeves being also tapered and also defining a truncated cone of relatively long longitudinal dimension and relatively small transverse dimensions, each of said arms being nested within its respective sleeves and being provided with tension means to retain such nested relationship.

References Cited by the Examiner

UNITED STATES PATENTS

| | | | |
|---|---|---|---|
| 1,515,805 | 11/24 | Brinkman | 296—97 |
| 1,745,695 | 2/30 | Hunter | 296—97 X |
| 1,880,582 | 10/32 | Thorp | 296—97 |
| 2,235,421 | 3/41 | Devine | 296—97 |
| 2,261,881 | 11/41 | Horstmann | 296—97 |
| 2,458,677 | 1/49 | Brundage | 296—97 |

FOREIGN PATENTS

| | | |
|---|---|---|
| 1,132,147 | 10/56 | France. |
| 447,537 | 4/49 | Italy. |

A. HARRY LEVY, *Primary Examiner*.